United States Patent [19]

Mollet

[11] Patent Number: 4,849,615

[45] Date of Patent: Jul. 18, 1989

[54] APPARATUS FOR PROCESSING "SMART" CARDS

[75] Inventor: Jean P. Mollet, La Celle Saint Cloud, France

[73] Assignee: Flonic, Montrouge, France

[21] Appl. No.: 36,773

[22] Filed: Apr. 9, 1987

[30] Foreign Application Priority Data

Apr. 11, 1986 [FR] France ................... 86 05181

[51] Int. Cl.4 ............................................. G06K 5/00
[52] U.S. Cl. .................................... 235/380; 235/441;
235/492; 902/26
[58] Field of Search .................. 902/4, 26; 235/380,
235/441, 492, 449

[56] References Cited

U.S. PATENT DOCUMENTS

| | | | |
|---|---|---|---|
| 4,331,863 | 5/1982 | Sidline et al. | 235/449 X |
| 4,620,727 | 11/1986 | Stockburger et al. | 235/380 X |
| 4,643,453 | 2/1987 | Shapiro et al. | 235/380 X |
| 4,733,061 | 3/1988 | Hegi | 235/492 |

Primary Examiner—David L. Trafton
Attorney, Agent, or Firm—Sanford J. Asman

[57] ABSTRACT

Apparatus for processing smart cards, each card comprising a body, electrical contact tabs, and an integrated circuit placed in the card body and electrically connected to said tabs, said integrated circuit including storage means for storing monetary amounts unit-by-unit as the card is used, said apparatus comprising:

processor means capable of processing data stored in a card and suitable for feeding electrical power to said integrated circuit;

electrical connections suitable, when a card is in a determined position suitable for enabling data to be read from and/or written to said storage means, for inter-connecting said processor means and said integrated circuit in a card via said contact tabs; and marker means under the control of said processor means for marking the body of a card with marks representative of the quantity of charge units in the card which have already been used up.

8 Claims, 4 Drawing Sheets

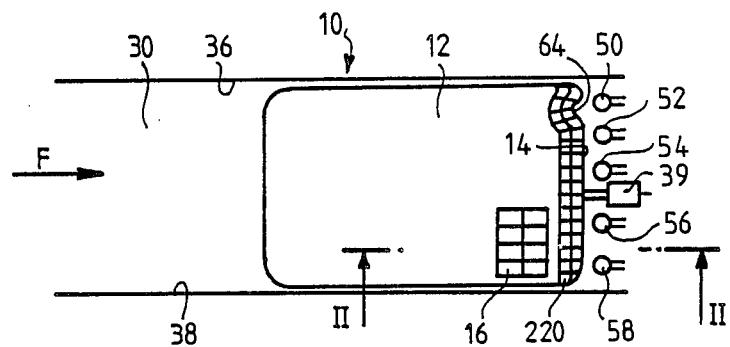
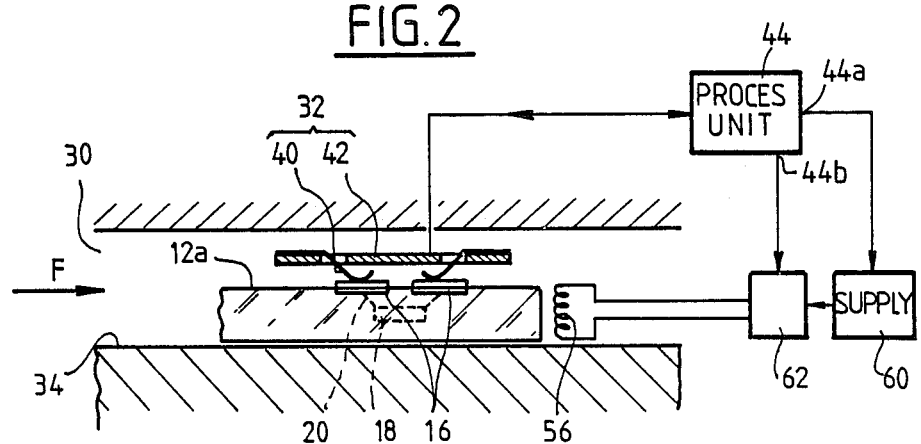

APPARATUS FOR PROCESSING "SMART" CARDS

The present invention relates to apparatus for processing so-called "smart" cards, i.e. cards including an electronic memory and designed for use as a means for payment for other authorization for obtaining goods or services.

BACKGROUND OF THE INVENTION

More and more installations are coming into use which enable goods or services to be obtained by means of a smart card. A user may buy a smart card from an organization which provides goods or services and the organization loads the card's memory with data representative of money's worth. Such an installation includes both apparatus for processing smart cards, generally referred to as a "reader", and means for supplying the requested goods or services. A typical service is a telephone call. Two situations can then occur: either the card holder uses a service, e.g. makes a telephone call, with the processing apparatus deducting a corresponding amount from the card memory in small increments throughout the duration of the service, (with the service being stopped when the credit in the card runs out); or else the user indicates (either directly or indirectly) a lump sum corresponding to the goods or services required, for example the user may indicate a desire to purchase a particular object, and in this case the processing apparatus verifies that sufficient credit is available in the card, and if it is, it deduct the appropriate lump sum from the previous credit total in the card, and causes the requested goods or service to be supplied to the card holder.

Several different types of smart card are in existence. The simplest type, referred to as a "pre-paid" card, stores data in its memory identifying the goods or services for which the card may be used, together with a certain number of memory locations corresponding to a matching number of charge units which the card holder can spend using the card. As the card is used, the memory locations corresponding to the charge units are "burned" until all of the available charge units have been used up. A more sophisticated smart card has a memory storing data relating not only to the type of goods or services made available by the card, but also data relating to the identity of the card holder. The card still includes memory zones for storing the cumulated value of goods or services obtained using the card, and this cumulated total is compared with a predetermined maximum for which the card is good. Such a card may require its holder to key a code number into the installation offering goods or services prior to making such goods or services available.

Regardless of the type of goods or services concerned, and regardless of the degree of sophistication of the memory system implemented by the card, a card holder is always faced with the problem of determining, at least approximately, how much credit remains in the card for obtaining further goods or services.

Although processing apparatus frequently includes means for displaying data and in particular for displaying the credit remaining in a card, the card holder has no way of establishing this amount without actually inserting the card in appropriate apparatus. This makes it particularly difficult for a user to decide when to buy a new "pre-paid" card or when to have a card of the other type renewed. It is all too easy for a user to discover that a card is "used up" when attempting to obtain goods or services which are urgently needed and for which no other form of payment is immediately available, for example on a public holiday or at night.

There is also the problem of smart cards being used by blind people who simply cannot see the display indicating how much credit remains. It is unlikely that card processing apparatuses will include audible as well as visible output means in the immediate future.

The present invention seeks to mitigate these drawbacks by providing apparatus for processing smart cards and capable of allowing a user to determine, at least approximately, how much credit remains in a card.

SUMMARY OF THE INVENTION

The present invention provides apparatus for processing smart cards, each card comprising a body, electrical contact tabs, and an integrated circuit placed in the card body and electrically connected to said tabs, said integrated circuit including storage means for storing monetary amounts unit-by-unit as the card is used, said apparatus comprising:

processor means capable of processing data stored in a card and suitable for feeding electrical power to said integrated circuit;

electrical connections suitable, when a card is in a determined position suitable for enabling data to be read from and/or written to said storage means, for interconnecting said processor means and said integrated circuit in a card via said contact tabs; and marker means under the control of said processor means for marking the body of a card with marks representative of the quantity of charge units in the card which have already been used up.

It is easy to see that the card holder can now obtain at least an approximate idea of the credit remaining in a card. In addition, since information on the credit remaining in the smart card is available in any event to card processing apparatus, the extra control needed for the marking means requires very little modification to the structure of the processing apparatus, and therefore does not significantly increase its cost.

BRIEF DESCRIPTION OF THE DRAWINGS

Embodiments of the invention are described by way of example with reference to the accompanying drawings, in which:

FIG. 1 is a fragmentary plan view of smart card processing apparatus provided with marking means in accordance with a first embodiment of the invention;

FIG. 2 is a vertical section on line II—II of FIG. 1;

DETAILED DESCRIPTION OF PREFERRED EMBODIMENTS

Smart cards are now well know. A detailed description may be obtained from U.S. Pat. No. 4,625,102, assigned to FLONIC. The following description therefore only describes those features of smart cards which are relevant to defining the present invention. Similarly, "card readers, i.e. apparatuses for processing smart cards, are also well known. A more detailed description may be obtained from published French patent applications numbers 2 554 260 and 2 534 262 in the name of FLONIC. The following description therefore describes only those portion of a card reader which are relevant to the present invention.

Figure 2A:
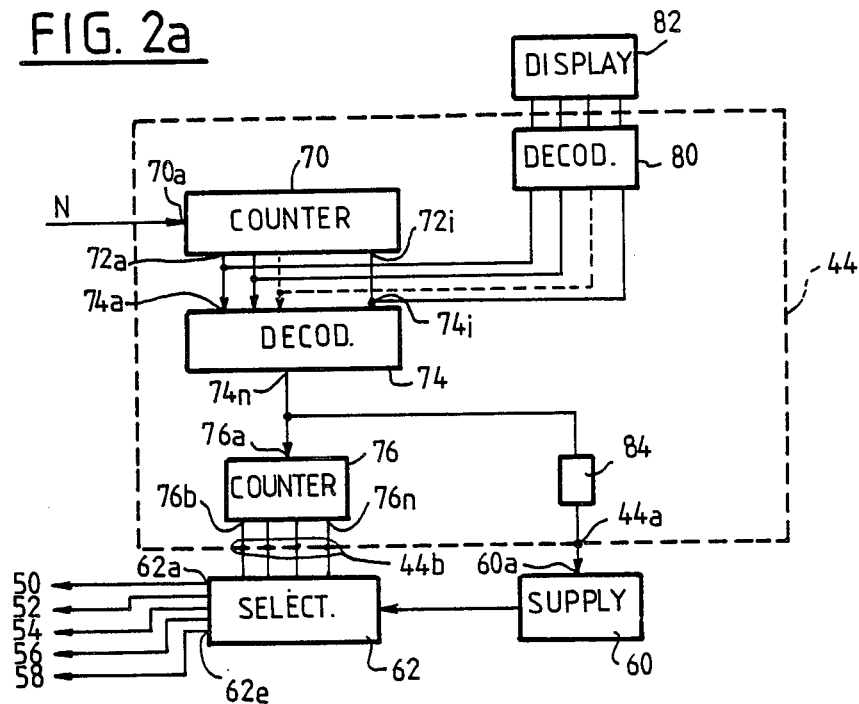
FIG. 2a is a diagram showing the circuit for controlling the marking means shown in FIGS. 1 and 2.

Reference is made initially to FIGS. 1, 2, and 2a while describing a first embodiment of the invention where the card is marked using heating resistors. FIGS. 1 and 2 show a smart card 10 which, in the example described, comprises a card body 12 made of a thermoplastic material such as PVC. The card body 12 is generally rectangular in shape and includes a leading edge 14 for insertion first into a card-receiving slot of a card reader. The card also includes a plurality of electric contact tabs 16 on one of its main faces, e.g. the face referenced 12a. As a general rule there are eight such tabs. As shown in simplified manner in FIG. 2, the smart card also includes a semiconductor chip 18 having an integrated circuit provided thereon. The chip 18 is preferably embedded in the card body 12 and the terminals of the chip 18 are connected to the contact tabs 12 by electrical connections 20.

The card reader includes an insertion passage 30 for guiding a card up to a read/write head 32 disposed in the passage 30. The insertion passage 30 is delimited by a floor 34 and by two side walls 36 and 38. The card 10 is moved from its insertion slot (not shown in the figure) up to the read position either manually or else under some form of mechanical drive. The arrival of the card in the proper read position is detected by a presence detector such as 39. The read head 32 is essentially constituted by as many electrical contacts 40 as there are contact tabs 16 on the card. The electrical contacts 40 are mounted on an insulating support 42 which also includes conductive paths for connecting each of the electrical contacts 40 to a unit 44 for feeding electricity to the card and for processing data received therefrom. The processing unit 44 serves firstly to control dialogue in both the read and the write directions between the reader and the integrated circuit in the card, and secondly to control the application of an operating voltage and optionally of a write voltage to the integrated circuit 18. The processor unit also serves to perform arithmetic or logic operations on information read from the memory in the card and on information directly inserted into the card reader, e.g. by means of a key pad.

As is well known, the integrated circuit 18 in the card is essentially constituted by one or more memories, together with associated read and write circuits, a circuit for controlling access to the memory, and in some cases an on-card unit for arithmetic and logic processing. The, or each, memory includes a writable and readable zone for storing data, in particular for money or money's worth relating to transactions, nonwritable zones for verifying the goods or services for which the card is valid, and optionally for verifying that the card is being used by a legitimate card holder, and finally, in some cases, programs for controlling operation of the arithmetic and logic unit.

As mentioned briefly above, the invention consists in providing means in the card reader for marking the card body in a manner related to the value of transactions already performed with the card, i.e. already recorded in its memory circuit.

The embodiment of the marking device shown in FIGS. 1 and 2 is more particularly suitable for cards of the prepayment type. In this type of card, memory zones serve to record transaction amounts as they are consumed, and are constituted by a pre-determined number of memory locations, with each memory lcoation corresponding to a single charge unit having the same value as any other charge unit therein. The number of memory locations in the memory zone corresponds to the total value of the card. As the card is used, the card reader irreversibly changes as many memory locations as the user has consumed charge units, with each charge unit corresponding, for example, to a telephone charging unit.

The marking device shown in FIGS. 1 and 2 marks the body of the card each time a further 20% of the total initial value available in the card has been consumed. To do this, the card reader includes five heating microresistance elements 50 to 58 which are disposed in the insertion passage 30 and which are aligned perpendicularly to the direction F of card insertion. These resistance elements may be replaced with any other appropriate heater elements. The resistance elements 50 to 58 are located in such a manner that when a card is in the read position, as detected by the sensor 39, they are not quite in contact with the leading edge 14 of the card, but are in the immediate proximity thereof. The marking device also includes a power supply circuit 60 for feeding the resistance elements 50 to 58 via a selector 62. The selector 62 has five outputs, each of which is connected to a corresponding one of the resistance elements 50 to 58. The power supply circuit 60 is controlled by a signal delivered by the processor unit 44 on an output 44a. Similarly, the selector 62 is controlled by a signal delivered by the processor unit on an output 44b. The processor unit 44 is permanently informed about the number of charge units that have been consumed throughout the time that a user is receiving goods or services. The processor unit 44 compares this number with thresholds that correspond respectively to 20%, 40%, etc. of the total capacity of the card. Each time a threshold is passed, the processor unit applies a digital signal on its output 44b indicating which threshold has just been passed. The value of this signal is applied to the input of the selector 62 which responds by switching on the connection between the power supply 60 and the resistance element 50 to 58 which corresponds to the threshold that has just been passed. The processor unit 44 then delivers a control signal on its output 44a to activate the power supply 60 so as to apply a predetermined current for a predetermined length of time to the selected resistance element. The electrical energy applied to the corresponding resistance element is determined in such a manner as to ensure that the radiation from the resistance element gives rise to a shallow notch 64 in the leading edge 14 of the card body.

As the card is used in various different card processing apparatuses, its various 20% thresholds are exceeded one-by-one and are therefore marked in corresponding manner on the leading edge 14 of the card.

The card holder is therefore permanently informed as to which 20% fraction of the total capacity of the card is the current fraction.

It will readily be understood, that the card holder is most concerned to known how many units remain when the card is nearly used up. In another embodiment, the thresholds for switching power to the marking resistance elements 50 to 58 are no longer uniformly spaced at 20% intervals, but are spaced at non-uniform intervals bunched together near the "used-up" end. For example, the first threshold may be at 80%, with the remaining thresholds being at uniform 5% intervals therefrom, i.e. at 85%, 90%, etc. with the resistance element 58 still corresponding to the card being fully used up.

FIG. 2a shows another embodiment of the portion of the processor unit 44 for controlling the selector 62 and the power supply circuit 60 for the resistance elements 50 to 58. This portion comprises a binary counter 70 having an input 70a on which it receives the number n of units used up so far in the card memory. The counter 70 has a count capacity which is greater than the maximum number of charge units available in the card. State outputs 72a to 72i from the counter 70 are applied to corresponding inputs 74a to 74i of a digital decoder 74. The decoder 74 is organized to deliver a pulse on an output 74n each time that the binary number applied to its input 74a to 74i reaches one of the threshold values $N_1, N_2, ..., N_5$ corresponding to the thresholds at which the resistance elements 50 to 58 should be operated. The output 70n from the decoder 70 is applied to the input 76a of a binary counter 76. The state outputs 76b to 76n from the counter 76 indicate in binary form the number of thresholds which have been passed, i.e. the number of a resistance element. The outputs 76b to 76n together constitute the output 44b from the processor unit 44 which is in turn applied to the control input of the selector 62.

The outputs 72a to 72i from the counter 70 are also connected to a decoder 80 which controls a display panel 82 on the card reader. Finally, the output 74n from the decoder 74 is connected to the output 44a from the processor circuit 44 via a delay circuit 84. The output 44a is connected to the control input 60a of the power supply 60.

The operation of this circuit follows from the above description. Each time the state of the counter 70 exceeds one of the thresholds $N_1, N_2, ..., N_5$, the detector 74 delivers a pulse. The counter 76 thus permanently contains the number of thresholds which have been exceeded, and thus the number of the resistance to which power should be applied. The state of the counter 76 selects a corresponding output 62a to 62e of the selector 62. After the delay set by the circuit 84 has elapsed, the pulse delivered thereby serves to activate the power supply circuit 60.

Naturally a different number of resistance elements may be used, with the maximum limit being set by the amount of room available on the leading edge of the card. Similarly, marking need not take place on the leading edge of the card but could take place on one of its longer side edges, in which case the resistance elements would need to be disposed along one of the edge walls of the insertion passage.

Figure 4:
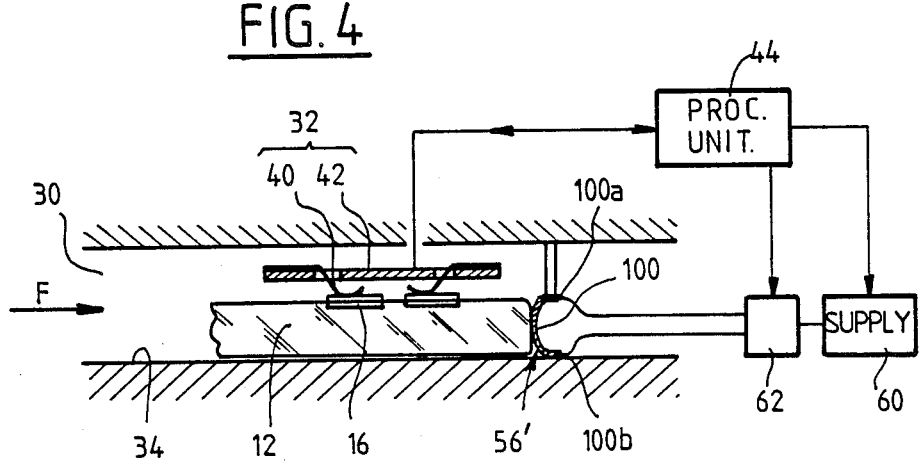
FIG. 4 is a vertical section through a variant of the card processing apparatus shown in FIG. 2.

FIG. 4 is very similar to FIG. 2 and shows a variant embodiment of the resistance elements used for making the card body. Each resistance element 50' to 58' is constituted by a resilient blade 100 having fixed ends 100a and 100b. These resistance elements are preferably made of beryllium bronze.

The resilience of the resistance elements enables them to be in permanent contact with the leading edge 14 of the card body, even if the dimensions of the card body are not exactly equal to the standard dimensions. Marking is obtained by contact between the card body and the bodies of the resistance elements 50' to 58', when any one of said elements is powered to enable it to penetrate into the material of the card body.

In the above-described embodiments, the resistance elements are fixed and there are as many such elements as there are thresholds to be marked. In a variant, the marking assembly may include only one marking element, with the marking element then being movable parallel to the edge of the card which is to be marked, and capable of occupying one out of n positions corresponding to n thresholds. The marking element may be moved by a mechanical system driven by a micromotor. The stroke provided by the motor is then controlled by the number contained in the counter 76 shown in FIG. 2a.

Figure 3A:
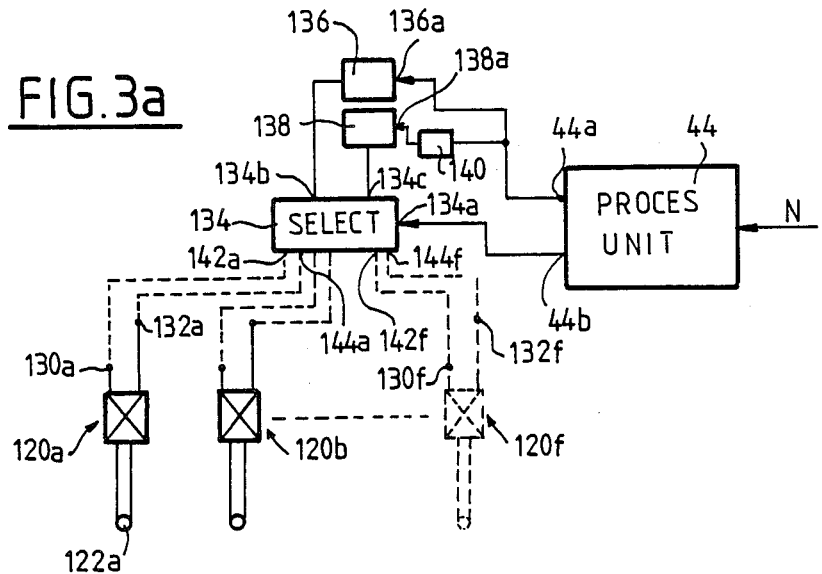
FIG. 3a is a diagram of the control circuit of the FIG. 3 marking system.
Figure 3:
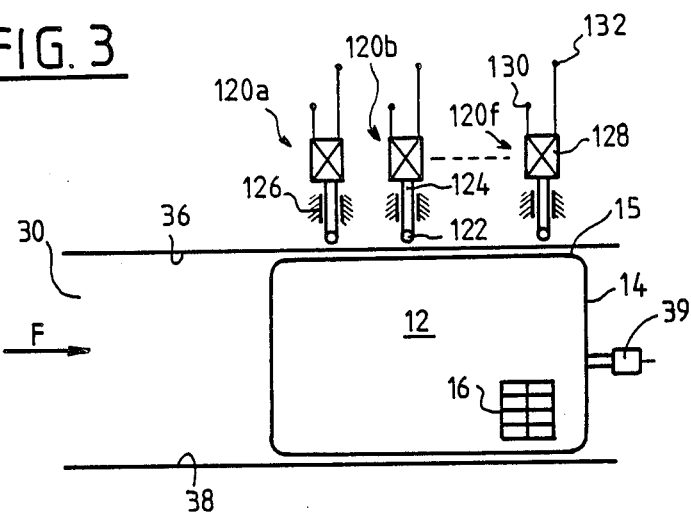
FIG. 3 is a plan view of smart card processing apparatus including a second embodiment of card marking means.

FIG. 3 shows a third embodiment of the invention in which used-up units are marked on a longitudinal edge 15 of the card body. In order to prevent the marking elements from running the risk of hindering the insertion of the card in the passage 30, these elements are retracted except when actually being used for marking purposes. Each marking element 120a to 120f is constituted by an electric heater element 122 mounted at the end of a rod 124 which is slidably received in a housing 126 extending perpendicularly to the wall 36 of the insertion passage 30. Displacement of each rod 124 is under the control of corresponding electromagnet 128. When an electromagnet 128 is unpowered, the corresponding rod occupies a retracted position as shown in FIG. 34. When power is applied to an electromagnet 128, the marking element 122 on its rod 124 projects into the passage 30. Each marking element 120 includes a terminal 130 for controlling the electromagnet 128 and a terminal 132 for controlling the application of power to the heater element 122.

FIG. 3a is a diagram showing the control of the marking elements 120a, 120b, ... 120f in greater detail. The processor circuit 44 is identical to that described with reference to FIG. 2a, and delivers a power supply control signal on its output 44a together with a digital signal on its output 44b indicating the number of the marking element which is to be activated. The output 44b is connected to the control input 134a of a dual-purpose selector 134. The selector 134 has two main inputs 134b and 134c which are respectively connected to a first power supply circuit 136 for feeding power to a heater element 122, and to a second power supply circuit 138 for feeding power to an electromagnet 128. The control input 136a of the power supply circuit 136 is connected to the output 44a of the processor unit 44, and the control input 138a of the power supply circuit 138 is likewise connected to the output 44a, but via a delay circuit 140.

The dual-purpose selector 134 has as many pairs of outputs 142, 144 as there are marking elements 120a to 120f. Each of the outputs 142 is connected to the control terminal 130 of a corresponding marking element 120, and each of the outputs 144 is connected to the terminal 132 of a corresponding marking element 120. The selector 134 serves to connect its main inputs 134b and 134c to one of its output pairs 142, 144, with the particular output pair selected being determined by the digital value of the signal applied to the control input of the selector.

Operation of the circuit shown in FIG. 3a can clearly be seen from the above description. When the number N of used up charge units exceeds one of the thresholds $N_1$ to $N_5$, the output 44b of the processor circuit provides a digital signal whose value corresponds to the number of the marking element 120a to 120f which is to be activated. The selector 134 connects its input 134b to that one of its outputs 142 which corresponds to the appropriate marking element, and similarly connects its input 134a to the appropriate corresponding one of its outputs 144. When a control signal appears at the output 44a of the processor circuit 44, the circuit 136 delivers the heating voltage which is applied to the selected heater element via the selector 134. Then, after a delay defined by the circuit 140 and corresponding to the time for which the element 122 should be heated, the power supply circuit 138 delivers a voltage which is applied to the electromagnet 128 of the selected marking element. The corresponding marking element 120 extends into the insertion passage 30 and makes a mark on the longitudinal edge 15 of the card body at the appropriate location.

Figure 5:
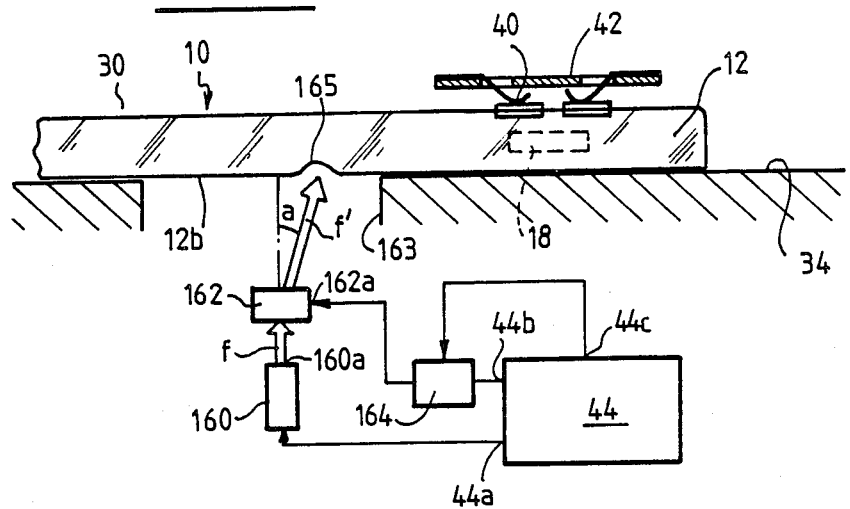
FIG. 5 is a vertical section through a fourth embodiment of card marking means, using a laser.

FIG. 5 shows a fourth embodiment of the marking system suitable for marking one of the main faces of the card body 12, e.g. its bottom face 12b. The marking system includes a laser 160 which emits a beam of sufficient energy to make a mark 162 on the bottom 12b of the card, without otherwise altering its dimensions. The laser 160 is associated with a controllable optical system 162 for modifying the direction of the laser beam f emitted by the laser 160. The optical system 162 is disposed between the output face 160a of the laser 160 and a window 163 provided in the floor 34 of the insertion passage 30. The window 163 is disposed in such a manner to ensure that when the card 10 is in the read/write position, the portion of the bottom 12b of the card visible through the window is far enough away from the semiconductor chip 18 embedded in the card body 12 (and from any magnetic track which may be on the card) in order to ensure that the laser beam does no damage.

The optical system 162 responds to a control signal applied to input 162a by deflecting the beam f so as to provide an output beam f' having a different point of impact on the bottom 12b of the card body 12 for each value of the control signal. The output 44b of the processor circuit delivers a digital signal representative of the charge unit threshold which has been exceeded. The output 44b is connected to a coding circuit 164. The output from the coding circuit connected to the control input 162a of the optical system 162. The value of the coded signal defines a beam direction suitable for making a mark 165 in an appropriate place on the bottom face 12b of the card body. The beam f' is deflected in a fixed plane which is parallel to the direction of card insertion. A similar system could be used based on an ultrasonic generator.

As mentioned above, there also exist smart cards which can be recharged or revalidated, i.e. once a first maximum number of charge units has been used by the card holder, the card holder can cause the card to be recharged to a new maximum number of units, e.g. by appropriate payment. The new maximum number is equal to the old maximum number.

The above-described apparatus may be modified to mark the quantity of units consumed each time the card is recharged. The processor circuit 44 reads from the card's memory not only the number of charge units which have been consumed in the most recently recharged or revalidated portion of the memory, but also the number of times the card has been charged or validated. The number of times a card has been charged is delivered on an additional output 44c of the processor circuit 44. This information is also applied to an input of the decoder circuit 164. The signal delivered by the decoder 164 and applied to the input 162a of the optical system 162 then contains two items of information: information concerning the thresholds applicable to the charge units currently being consumed, and information concerning the number of times the card has been charged. The first item causes the optical control system 162 to deflect the beam f' in a plane parallel to the long direction of the card (angle a in FIG. 5). The second item of information controls the optical system to deflect the beam f' in a plane perpendicular to the abovementioned plane through an angle b (not shown in FIG. 5). It will thus be understood that each time the card is recharged marks are made at various different angles a long the same angle b.

Figure 5A:
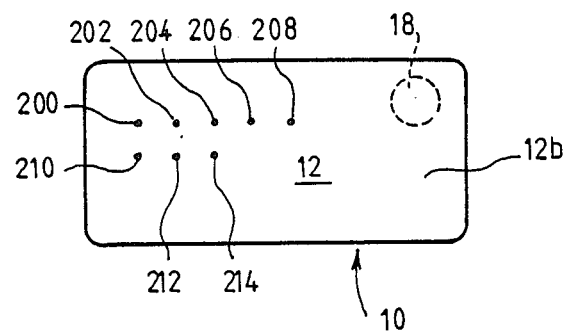
FIG. 5a is a back view of a smart card showing the type of marking obtained using the FIG. 5 marking system.

FIG. 5a shows marks obtained in this way on the back 17 of a card. Marks 200 to 208 correspond to a first charge of the card being spent, with five different thresholds being provided. Marks 210 to 214 indicate that the card has been charged a second time and that three thresholds have been passed for a second time, i.e. two thresholds remain.

Naturally, the system for reading smart cards could make marks thereon by means other than a laser or a heater element as described above. For example, punch means could be used to make marks on one of the main faces of the card body similar to those shown in FIG. 5a.

It should also be added, that if marking is provided by heating the edge of a card, i.e. by localized melting of the material from which the card body is made, it may be advantageous to provide special printing or other design on one or other of the main faces of the card body in the vicinity of the edge which is marked. The design or pattern may be constituted by a grid of squares 220 as shown in FIG. 1. The heating of the plastic material which gives rise to a notch 64 also severely distorts the grid in the heated zone 222, thereby making it easier to detect a mark visually.

What is claimed is:

1. Apparatus for processing smart cards, each card comprising a body, electrical contact tabs, and an integrated circuit placed in the card body and electrically connected to said tabs, said integrated circuit including storage means for storing monetary amounts unit-by-unit as the card is used, said apparatus comprising:

processor means capable of processing data stored in a card and suitable for feeding electrical power to said integrated circuit, said processor means including comparator means for comparing the quantity of units already used with a plurality, n, of predetermined threshold amounts, together with control means responsive to said comparator means for controlling the marking of the card body at a location corresponding to that one of said thresholds which has been reached;

electrical connections suitable, when a card is in a determined position suitable for enabling data to be read from and/or written to said storage means, for inter-connecting said processor means and said integrated circuit in a card via said contact tabs; and marker means under the control of said processor means for marking the body of a card with marks representative of the quantity of charge units in the card which have already been used up.

2. Apparatus according to claim 1, wherein said marker means comprise n distinct marking elements, each marking elements being associated with a corresponding one of said thresholds.

3. Apparatus according to claim 2, wherein said marking elements are heater elements, with each heater element being suitable for making a notch in an edge of the card when power is applied to said element.

4. Apparatus according to claim 1, wherein said n thresholds subdivide the total capacity of the card into n equal portions.

5. Apparatus according to claim 1, wherein the first of said n thresholds corresponds to a portion of the total capacity of the card which is greater than the portions of said total capacity separating consecutive pairs of said thresholds.

6. Apparatus according to claim 1, wherein the card is marked along that edge of the card body which is the leading edge when the card is inserted into said apparatus.

7. Apparatus according to claim 1, wherein the card is marked along one of the edges of the card body which extends parallel to the direction in which the card is inserted into said apparatus.

8. Apparatus according to claim 1, wherein the card is marked on one of the main faces of the card body.

* * * * *